US010249942B2

(12) United States Patent
Moromoto

(10) Patent No.: US 10,249,942 B2
(45) Date of Patent: Apr. 2, 2019

(54) TWO-WHEELED MOTOR VEHICLE

(71) Applicant: YAMAHA HATSUDOKI KABUSHIKI KAISHA, Iwata-shi, Shizuoka-ken (JP)

(72) Inventor: Hiroyuki Moromoto, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 479 days.

(21) Appl. No.: 14/780,816

(22) PCT Filed: Mar. 20, 2014

(86) PCT No.: PCT/JP2014/057908
§ 371 (c)(1),
(2) Date: Sep. 28, 2015

(87) PCT Pub. No.: WO2014/157011
PCT Pub. Date: Oct. 2, 2014

(65) Prior Publication Data
US 2016/0043462 A1    Feb. 11, 2016

(30) Foreign Application Priority Data

Mar. 28, 2013    (JP) .................................. 2013-068991

(51) Int. Cl.
| | |
|---|---|
| *H01Q 1/32* | (2006.01) |
| *B62J 99/00* | (2009.01) |
| *B62K 11/04* | (2006.01) |
| *B62K 19/40* | (2006.01) |
| *H01Q 1/48* | (2006.01) |

(Continued)

(52) U.S. Cl.
CPC ............ *H01Q 1/3283* (2013.01); *B62J 99/00* (2013.01); *B62K 11/04* (2013.01); *B62K 19/40* (2013.01); *H01Q 1/3208* (2013.01); *H01Q 1/3233* (2013.01); *H01Q 1/48* (2013.01);
(Continued)

(58) Field of Classification Search
CPC ...... H01Q 1/3283; H01Q 1/3266; H01Q 1/32; H01Q 1/3208; H01Q 1/3216; H01Q 1/3225; H01Q 1/3233; H01Q 1/3241; H01Q 1/325
See application file for complete search history.

(56) References Cited

U.S. PATENT DOCUMENTS 2,267,266 A * 12/1941 Brown ................... H01Q 1/27
343/712
4,658,266 A    4/1987 Doty, Jr.
(Continued)

FOREIGN PATENT DOCUMENTS

EP    1143259 A2    10/2001
EP    1690761 A2    8/2006
(Continued)

*Primary Examiner* — Dameon E Levi
*Assistant Examiner* — Jennifer F Hu
(74) *Attorney, Agent, or Firm* — Rabin & Berdo, P.C.

(57) ABSTRACT

A two-wheeled motor vehicle having a main frame on which a metal structure is mounted, and first and second antennas, disposed outside the main frame in a vehicle width direction, for road-to-vehicle and vehicle-to-vehicle communications. The first and second antennas are opposite to each other and are separated by the metal structure of the main frame.

11 Claims, 11 Drawing Sheets

(51) Int. Cl.
*H01Q 9/38* (2006.01)
*H01Q 21/08* (2006.01)
*H01Q 21/29* (2006.01)

(52) U.S. Cl.
CPC .............. *H01Q 9/38* (2013.01); *H01Q 21/08* (2013.01); *H01Q 21/29* (2013.01)

(56) References Cited

U.S. PATENT DOCUMENTS

| | | | |
|---|---|---|---|
| 6,483,467 B2 | 11/2002 | Kushida et al. | |
| 7,317,936 B2* | 1/2008 | Katayama | ............. H01Q 1/246 455/556.1 |
| 2005/0099320 A1* | 5/2005 | Nath | ................... G06Q 30/0284 340/933 |
| 2005/0206122 A1* | 9/2005 | Ichihara | ............... B62K 25/283 280/284 |
| 2005/0263334 A1* | 12/2005 | Okabe | .................... B62K 11/06 180/219 |
| 2010/0082249 A1 | 4/2010 | Ando et al. | |

FOREIGN PATENT DOCUMENTS

| | | | | |
|---|---|---|---|---|
| EP | 2180333 A1 | * | 4/2010 | ........... B60R 25/102 |
| EP | 2180544 A1 | * | 4/2010 | ........... B60R 25/102 |
| JP | H05-91003 A | | 4/1993 | |
| JP | 05238438 A | * | 9/1993 | |
| JP | 2003-309419 A | | 10/2003 | |
| JP | 2003309419 A | * | 10/2003 | |
| JP | 2005-234921 A | | 9/2005 | |
| JP | 2008-114654 A | | 5/2008 | |
| JP | 4156783 B2 | | 9/2008 | |
| JP | 2010-085262 A | | 4/2010 | |
| JP | 2012051443 A | * | 3/2012 | ................ B62H 5/00 |

\* cited by examiner

TWO-WHEELED MOTOR VEHICLE

TECHNICAL FIELD

The present invention relates to a two-wheeled motor vehicle. More particularly, the present invention is directed to a two-wheeled motor vehicle provided with antennas for road-to-vehicle communications and vehicle-to-vehicle communications.

BACKGROUND ART

In recent years, two-wheeled motor vehicles have been developed for performing communications specified in ASV (Advanced Safety Vehicle) using IT (Information Technology), which is a part of ITS (Intelligent Transport System). Examples of such two-wheeled motor vehicles include a vehicle having an antenna disposed forward of the vehicle for performing communications with front vehicles or roadside units. See, for example, Japanese Patent No. 4156783. Specifically, a non-directional antenna is disposed forward of an inclined line extending between the middle of a bar handle and an axle of a front wheel. This prevents influences of electromagnetic wave absorption by the rider's body, and prevents reductions in electromagnetic fields in vertical and horizontal directions.

PRIOR ART DOCUMENTS

Patent Documents

[Patent Document 1] Japanese Patent No. 4156783

SUMMARY OF INVENTION

Technical Problem

However, a conventional two-wheeled motor vehicle with such a configuration has the following drawbacks. The conventional two-wheeled motor vehicle has a disadvantage for vehicle-to-vehicle communications between the rider's own vehicle and rearward vehicles among other vehicles. Although the influences of electromagnetic wave absorption by the rider is decreased with the antenna disposed on a head light forward of the rider, it is impossible to eliminate the influence of absorption or reflection by the rider. Moreover, the influence of electromagnetic wave attenuation or reflection increases upon riding double or with a load rearward of a tandem seat of the two-wheeled motor vehicle. Especially, with a load, a communication distance becomes shorter due to additional electromagnetic wave absorption or reflection corresponding to materials of the load. FIG. 16 illustrates an emission pattern Ep6 of electromagnetic waves under such a condition. The emission pattern Ep6 includes a rearward portion with degraded electromagnetic wave intensities.

The present invention has been made in view of the state of the art noted above, and one of its objects is to provide a two-wheeled motor vehicle that allows suitable communications with side vehicles and roadside units as well as suitable vehicle-to-vehicle communications with forward and rearward vehicles.

Solution to Problem

The present invention is constituted as stated below to achieve the above object. The present invention provides a two-wheeled motor vehicle. The two-wheeled motor vehicle includes a vehicle body frame with a main frame on which a metal structure is mounted and a seat frame rearward of the main frame, a first antenna disposed outside the main frame in a vehicle width direction, and a second antenna opposite to the first antenna across at least the metal structure of the main frame and the metal structure. The two-wheeled motor vehicle performs road-to-vehicle communications with roadside units and vehicle-to-vehicle communications with other vehicles using the first antenna and the second antenna.

With the configuration, the first and second antennas are disposed outside the main frame across the metal structure or the metal structure and the main frame. This causes the electromagnetic waves from the first antenna to the second antenna to be reflected by the main frame or the metal structure mounted on the main frame. The electromagnetic waves from the second antenna to the first antenna are reflected in the same manner. Consequently, the electromagnetic waves from the first antenna and from the second antenna are not received simultaneously in transverse and oblique directions of the vehicle, allowing elimination of interference of the electromagnetic waves.

Moreover, the first antenna is disposed opposite to the second antenna across the metal structure. This reduces a difference between a first distance, which is the distance between the first antenna and a receiving point of the electromagnetic waves travelling forward/rearward, and a second distance that is between the second antenna and the receiving point. Consequently, the electromagnetic waves from both antennas reach the receiving point in substantially the same phase, leading to a slight variation in electric field intensity. It is therefore possible to perform road-to-vehicle communications and vehicle-to-vehicle communications in the longitudinal, traverse, and oblique directions of the vehicle.

Moreover, it is preferred that the first antenna and the second antenna are each a linear antenna. Using the linear antenna allows the road-to-vehicle communications and the vehicle-to-vehicle communications at low prices.

Moreover, it is preferred that the first antenna and the second antenna each have forward/rearward directionality. This allows forward/rearward communications with forward/rearward vehicles spaced farther away than side vehicles.

Moreover, it is preferred that the linear antenna is a Brown antenna having a ground longer in a longitudinal direction than in a vehicle width direction, and a linear unit as a radiation conductor. It is also preferred that the ground has a length in the longitudinal direction that is longer than a length of the linear unit. This configuration achieves the antenna having the forward/rearward directionality using the inexpensive linear antenna.

Moreover, it is preferred that the main frame includes a front frame disposed forward of a head tube. When the metal structure reflecting the electromagnetics wave is disposed within an area enclosed with the front frame, the electromagnetic waves from both the first antenna and the second antenna are received only in the longitudinal direction of the vehicle body. In addition, the first antenna and the second antenna can be disposed forward of the head tube. This enhances arrangement flexibility of the antennas.

Moreover, it is preferred that the metal structure is an engine unit. The first antenna and the second antenna are disposed across the engine unit, allowing elimination of the interference of the electromagnetic waves in the traverse and oblique directions of the vehicle.

Moreover, the main frame includes a reinforcing board reinforcing rigidity of the main frame. The metal structure may be the reinforcing board. The first antenna and the second antenna are disposed across the reinforcing board, allowing elimination of the interference of the electromagnetic waves in the traverse and oblique directions of the vehicle.

Moreover, the metal structure may be metal accessories. The first antenna and the second antenna are disposed across the metal accessories, allowing elimination of the interference of the electromagnetic waves in the traverse and oblique directions of the vehicle.

Moreover, it is preferred that the first antenna and the second antenna do not overlap rider's feet in a travelling attitude in side view. The first antenna and the second antenna do not overlap the rider's feet in the traveling attitude in side view. This prevents the rider's feet from absorbing the electromagnetic waves emitted from the first antenna and the second antenna.

Moreover, it is preferred that the first antenna and the second antenna are disposed between a cover and the main frame, the cover covering at least a part of the main frame. This allows attachment of the cover after assembling the first antenna and the second antenna, enhancing efficiency in assembly work.

Moreover, it is preferred that the first antenna and the second antenna are disposed in the same level in side view. The first antenna and the second antenna are disposed in the same level, achieving reduction in distance difference of the electromagnetic waves between the receiving point and the antennas in the forward/rearward direction. Consequently, satisfactory communications are obtainable.

Moreover, it is preferred that the first antenna and the second antenna overlap the main frame or the engine in side view. Consequently, the electromagnetic waves spreading from the antennas toward the middle of the vehicle are reflected on the main frame or the engine, whereby only the electromagnetic waves only reflected from either the first or second antenna is received in the traverse and oblique directions. This allows elimination of a variation in intensity of the electromagnetic waves due to the interference.

Advantageous Effects of Invention

The two-wheeled motor vehicle according to the present invention allows suitable communications with the side vehicles and the roadside units as well as suitable vehicle-to-vehicle communications with forward and rearward vehicles.

EMBODIMENT 1

The following describes Embodiment 1 of the present invention with reference to the drawings. A scooter-type two-wheeled motor vehicle is to be described as one example of a two-wheeled motor vehicle in the present invention. In the following description, "front," "rear," "right" and "left" are based on a traveling direction of the two-wheeled motor vehicle.

1. Outline Construction of a Two-Wheeled Motor Vehicle

Figure 1:
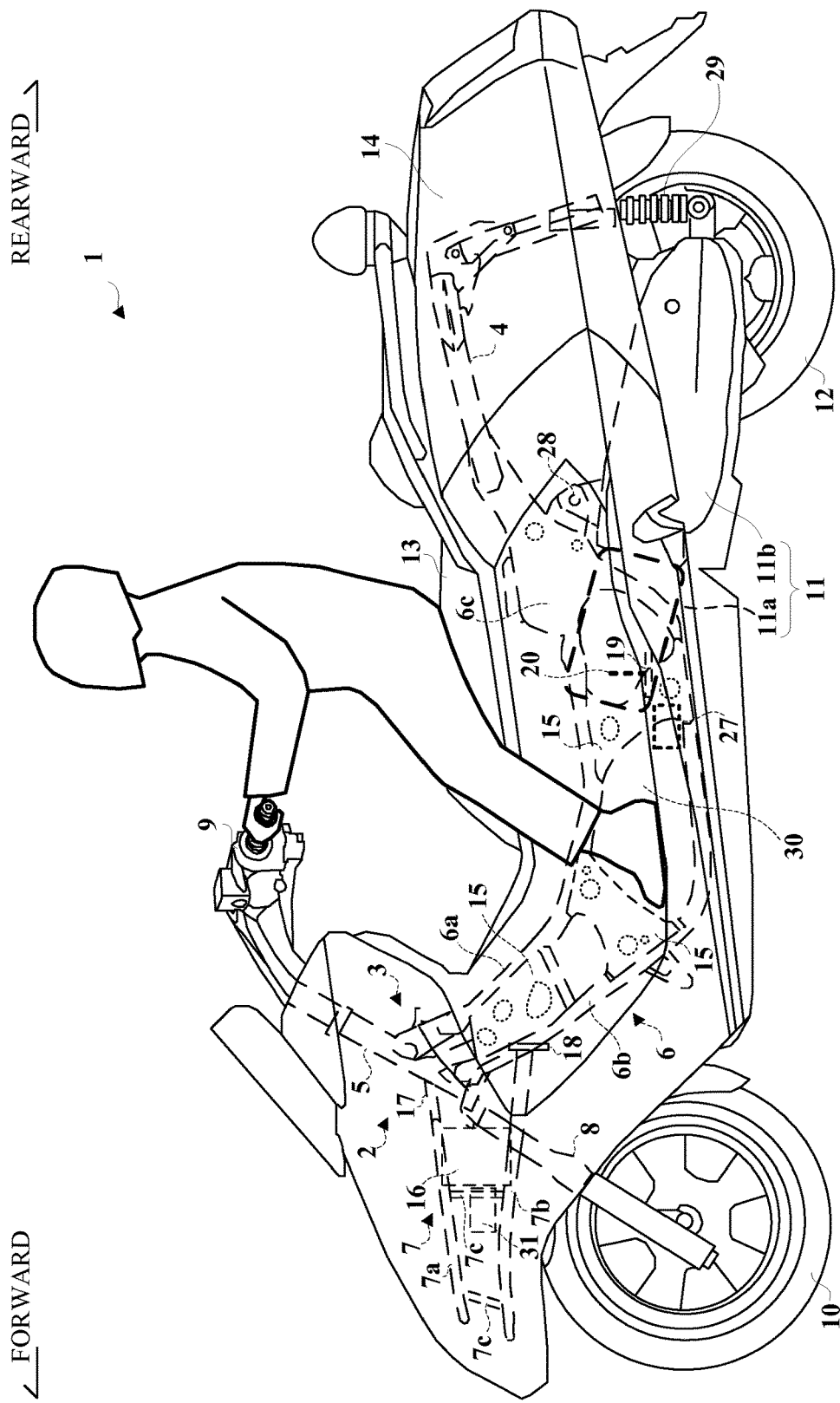
FIG. 1 is a side view of a vehicle according to Embodiment 1 of the present invention.
Figure 2:
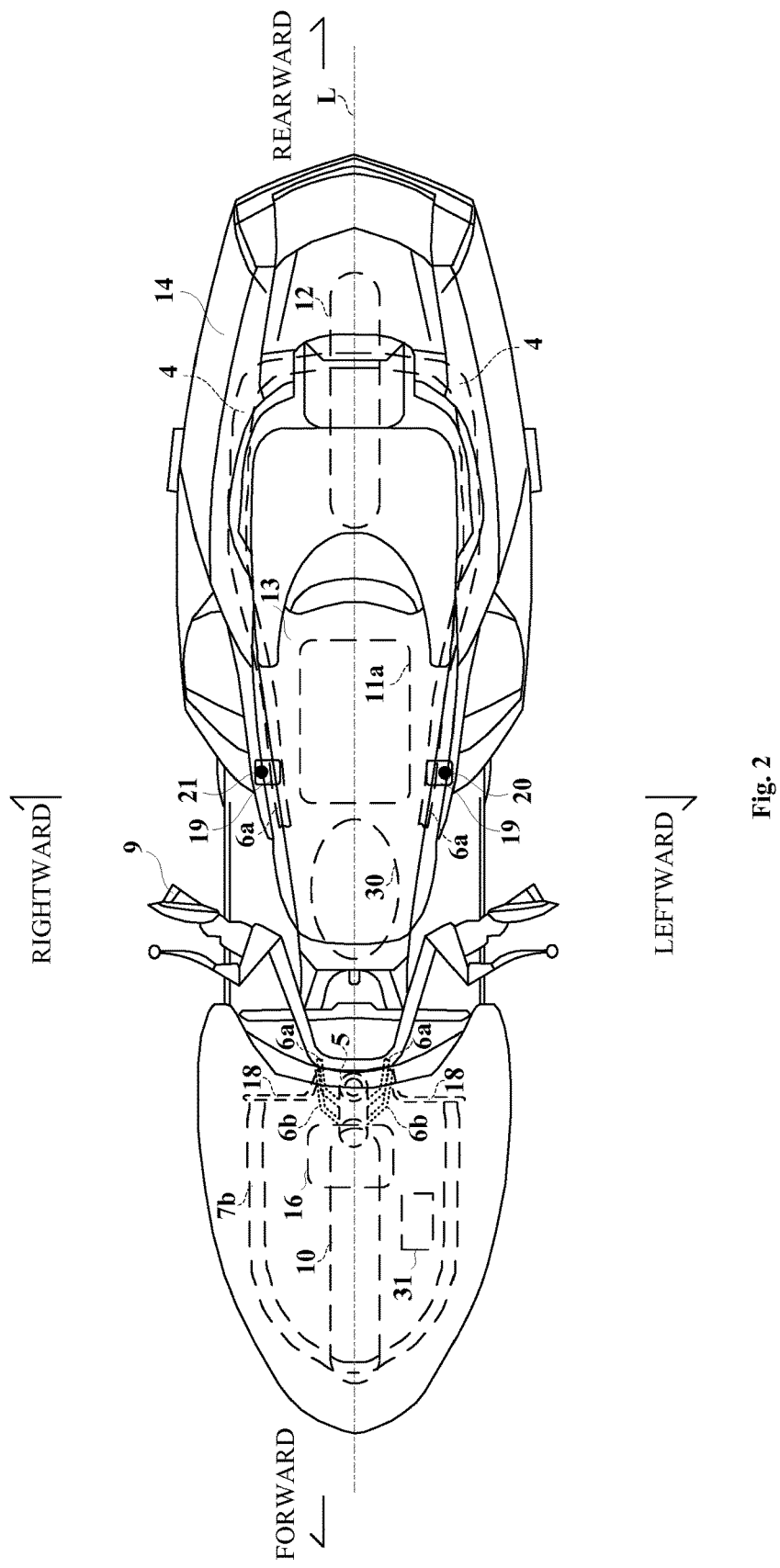
FIG. 2 is a plan view of the vehicle according to Embodiment 1.

Reference is made to FIGS. 1 and 2. FIG. 1 is a side view illustrating an outline construction of a two-wheeled motor vehicle 1 according to Embodiment 1. FIG. 2 is a plan view illustrating the outline construction of the two-wheeled motor vehicle 1. The two-wheeled motor vehicle 1 includes a so-called underbone-type vehicle body frame 2. The vehicle body frame 2 includes a main frame 3 and a seat frame 4. The main frame 3 is formed by a head tube 5, a frame main body 6, and a front frame 7. Here, the main frame 3 does not necessarily include the front frame 7 depending on the type of the two-wheeled motor vehicle 1. The vehicle body frame 2 is covered with a vehicle body cover 14.

Front forks 8 are supported on the head tube 5 via a steering shaft, not shown, and are swingable in right and left directions. That is, the front forks 8 are swingable in the right and left directions by inserting a steering shaft fixed on upper ends of the front forks 8 into the head tube 5. A handle bar 9 is connected to an upper part of the steering shaft. Operation of the handle bar 9 causes the front forks 8 to swing. A front wheel 10 is rotatably attached to lower ends of the front forks 8.

An engine unit 11 is attached rearward of the frame main body 6. The engine unit 11 is a well-known unit swing engine. The engine unit 11 includes an engine 11a and a transmission case 11b extending leftward from the engine 11a toward the rear wheel. The engine 11a and the transmission case 11b are integrated with each other to be suspended vertically and swingably on the vehicle body. The transmission case 11b accommodates a transmission mechanism for transmitting engine rotation to the rear wheel. A rear wheel output shaft, not shown, is located rearward of the transmission case 11b. The rear wheel 12 is connected to the rear wheel output shaft. A seat 13 is provided above the engine 11a.

The vehicle body cover 14 between the engine unit 11 and the seat 13 extends rearward and above of the engine unit 11 in side view. The rear wheel 12 is disposed below the vehicle body cover 14. A rear part of the engine unit 11 is exposed externally. A fuel tank 30 is provided forward of the engine 11a.

The frame main body 6 includes an upper frame 6a, a lower frame 6b, and a connection bracket 6c to which rear ends of the upper and lower frames 6a and 6b are connected. The connection bracket 6c is made of a sheet metal, and has a hollow structure (Monaka structure). The upper frame 6a is composed of paired right and left upper frame portions, and the portions are welded on the side surface of the head tube 5 in the middle portion thereof in the vertical direction, from which the portions extend rearward apart from each other rightward and leftward. In addition, the lower frame 6b is composed of paired right and left lower frame portions, and the portions are welded on the side surface of the head tube 5 in the lower portion thereof, from which the portions extend rearward below the upper frames 6a apart from each other rightward and leftward. The lower frame 6b extends upward on the rearward portion thereof, and the rear end thereof is welded on the connection bracket 6c. The rear end surface of the upper frame 6a is welded on the connection bracket 6c. The front end surface of the seat frame 4 is welded on the connection bracket 6c. Here, FIG. 2 partially illustrates the upper frame 6a omitted by break lines. In addition, the lower frame 6b overlaps the upper frame 6a in the plan view, and accordingly, a portion rearward of the handle bar 9 is omitted.

A reinforcing board (gazette) 15 is suspended dispersedly and is welded at a plurality of positions between the upper frame 6a and the lower frame 6b in the forward/rearward direction. The reinforcing board 15 is made of metal, and reinforces the rigidity of the upper frame 6a and the lower frame 6b. A pivot shaft 28 is disposed rearward of the connection bracket 6c for holding the engine unit 11 so as to oscillate vertically. A rear cushion unit 29 is disposed between the rear portion of the seat frame 4 and the transmission case 11b for cushion of oscillation of the engine unit 11.

The front frame 7 includes an upper frame 7a, a lower frame 7b, and a connection frame 7c. The upper frame 7a is rectangular when seen in plan view. The lower frame 7b is in a U-shape having an opening directed rearward. Both of the frames are connected via the connection frame 7c at two right and left positions. The proximal end surface of the upper frame 7a is bolted to the head tube 5 via a bracket 17 provided in the middle of the vehicle width. Moreover, right and left proximal end surfaces of the lower frame 7b are bolted via the lower frame 6b of the frame main body 6 and a bracket 18. The bracket 18 is welded on the right and left lower frames 6b. Here in FIG. 2, the upper frame 7a is omitted.

A battery 16 is held on a cross member (not shown) suspended over the lower frame 7b in the vehicle width direction, and is accommodated in the front frame 7. The battery 16 includes multiple electrode plates inside thereof. An ECU (Engine Control Unit) 31 is disposed forward of the battery 16. The engine 11a and the reinforcing board 15 correspond to the metal structure in the present invention.

Two antennas 20 and 21 are disposed across the engine 11a outside the reinforcing board 15 and the main frame 3 (frame main body 6) in the vehicle width direction. The antennas 20 and 21 are opposite to each other across the center line L orthogonal to the width direction of the two-wheeled motor vehicle 1. The antennas 20 and 21 are held with brackets 19 individually. Each of the brackets 19 is attached to the reinforcing board 15. The antennas 20 and 21 are disposed at the same level. The antennas 20 and 21 allow the two-wheeled motor vehicle 1 to perform road-to-vehicle communications with the roadside units and vehicle-to-vehicle communications with other vehicles. A radio equipment 27 for connecting to the antennas 20 and 21 is disposed forward of the antennas 20 and 21 in this embodiment, but is not necessarily disposed forward of the antennas in other embodiments.

2. Configuration of the Antenna

Figure 3:
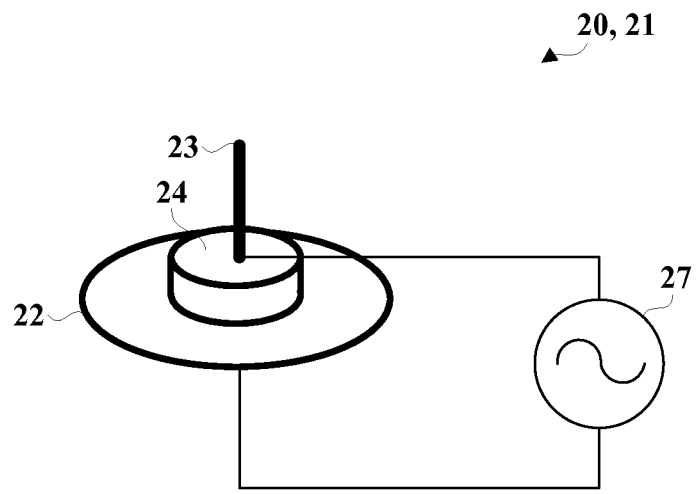
FIGS. 3 and 4 each illustrate an antenna according to Embodiment 1.
Figure 4:
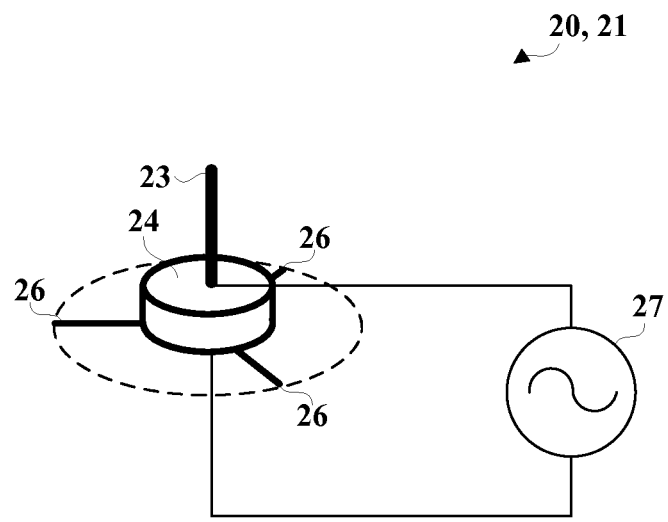

The following describes a configuration of the antennas provided in the two-wheeled motor vehicle 1 with reference to FIGS. 3 and 4. FIGS. 3 and 4 each illustrate a configuration of the antennas.

The antennas 20 and 21 are each a non-directional linear antenna. Examples of the non-directional linear antenna include a vertical dipole antenna and a Brown antenna. In Embodiment 1, a Brown antenna is adopted. The antennas 20 and 21 each include a ground plane 22, a conductor rod 23, and an insulation member 24. The insulation member 24 is provided between the ground plane 22 and the conductor rod 23. The radio equipment 27 supplies power to the ground plane 22 and the conductor rod 23.

The ground plane 22 is in a disk shape. Alternatively, instead of the disk ground plane 22, three or more metal wires 26 extending radially on a plane may be adopted. See FIG. 4. The ground plane 22 or the metal wires 26 corresponds to the ground in the present invention. The conductor rod 23 is a radiation conductor erected upward from the insulation member 24. The conductor rod 23 corresponds to the linear unit in the present invention. The insulation member 24 is a plate made of a fluorine resin. The insulation member 24 may be made of other materials such as plastic, or may be formed by other insulating materials. The radio equipment 27 supplies high-frequency power to the ground plane 22 or the metal wires 26 as well as the conductor rod 23.

It is preferred that two-thirds or more of the conductor rod 23 overlaps the metal structure in side view, and it is more preferred that the entire of the conductor rod 23 overlaps the metal structure in side view.

Figure 5:
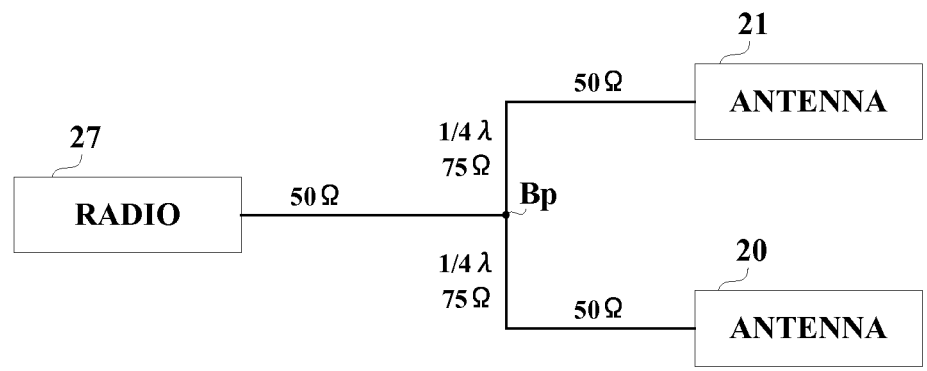
FIG. 5 illustrates an antenna distributor according to Embodiment 1.

FIG. 5 illustrates an antenna distributor with a ¼-wavelength transformer. It is assumed that impedance from the radio equipment 27 to a bifurcation point Bp to the antennas 20 and 21 is 50Ω. Then the radio equipment 27 is connected to wires of 75Ω by a ¼ wavelength (¼λ) at the bifurcation point Bp, and is connected via wires of 50Ω to the antennas 20 and 21 individually adjusted to be of 50Ω. Such a configuration facilitates coaxial feeding. That is, an electromagnetic wave signal from the radio equipment 27 is distributed to the antennas 20 and 21 at the same phase. Such two distribution circuits for the antennas 20 and 21 can each be formed with a lumped constant matching circuit. With the ¼-wavelength transformer, a coaxial line or a printed wiring board is usable, leading to easy install of the antennas within the two-wheeled motor vehicle 1. The antenna distributor is not limited to this configuration, and may adopt other configurations.

Moreover, the antennas 20 and 21 are disposed in the middle of the vehicle body of the two-wheeled motor vehicle 1, whereby the antenna bifurcation can be disposed in the middle of the vehicle body. Accordingly, a power feeder from the radio equipment 27 to the bifurcation point Bp can be made short, leading to suppression in noise entering and in attenuation of electromagnetic wave signals. Moreover, the radio equipment 27 with a relatively sufficient weight can be disposed in the middle of the vehicle body, achieving suppression in weight unbalance of the two-wheeled motor vehicle 1.

An electromagnetic wave among the electromagnetic waves from the antennas 20 and 21 toward inside of the vehicle body reflects on the metal structure such as the engine 11a to travel toward outside of the vehicle body. Consequently, the electromagnetic wave traveling toward the outside of the vehicle body is brought into interference with the electromagnetic waves from the antennas and reflected on the metal structure. This causes different intensities of the electromagnetic waves in different receiving positions. However, since a communication distance in the traverse direction may be shorter than that in the forward/rearward direction, a low intensity of the electromagnetic waves in the traverse direction is not problematic.

3. Property of the Antenna

Figure 6:
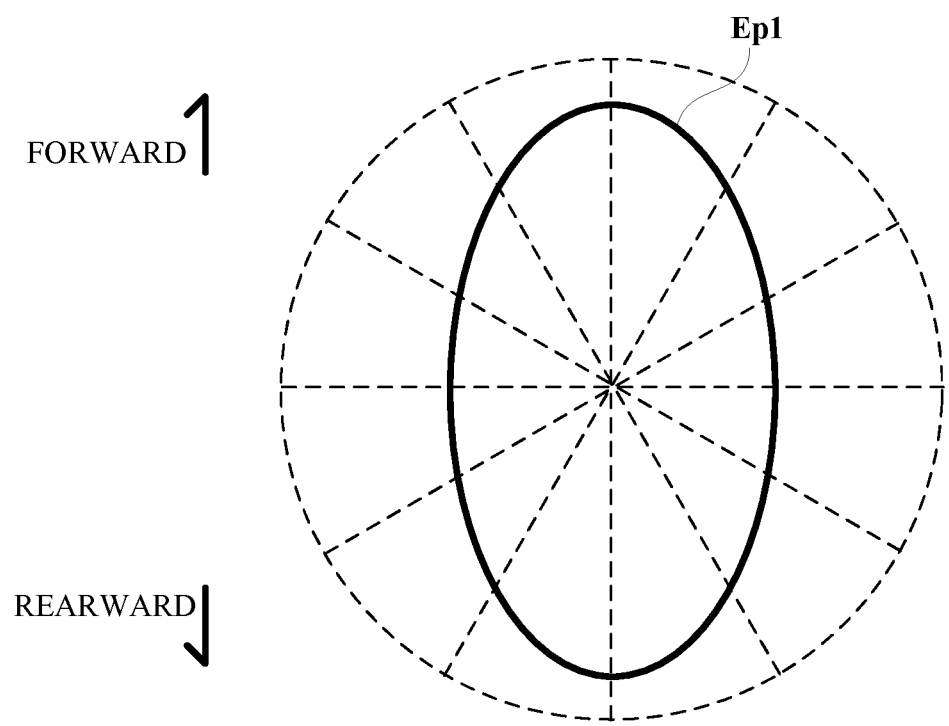
FIG. 6 illustrates an ideal emission condition of electromagnetic waves from the antenna.

The following describes properties of the conventional antenna and the antennas in Embodiment 1. FIG. 6 illustrates a property of the antenna ideal for the two-wheeled motor vehicle. In the two-wheeled motor vehicle 1, the vehicle-to-vehicle communications with other vehicles in the traverse direction are performed at a communication distance a little longer than a road width. On the other hand, the vehicle-to-vehicle communications with other forward/rearward vehicles or the road-vehicle communications with the roadside units are performed at long distances to the other vehicles. Accordingly, a communication distance is likely to be long. As a result, as illustrated in FIG. 6, it is preferred that the property of the antennas for the two-wheeled motor vehicle 1 travelling on the road is an emission pattern Ep1 having a length longer in the forward/rearward direction than in the width direction.

Figure 7:
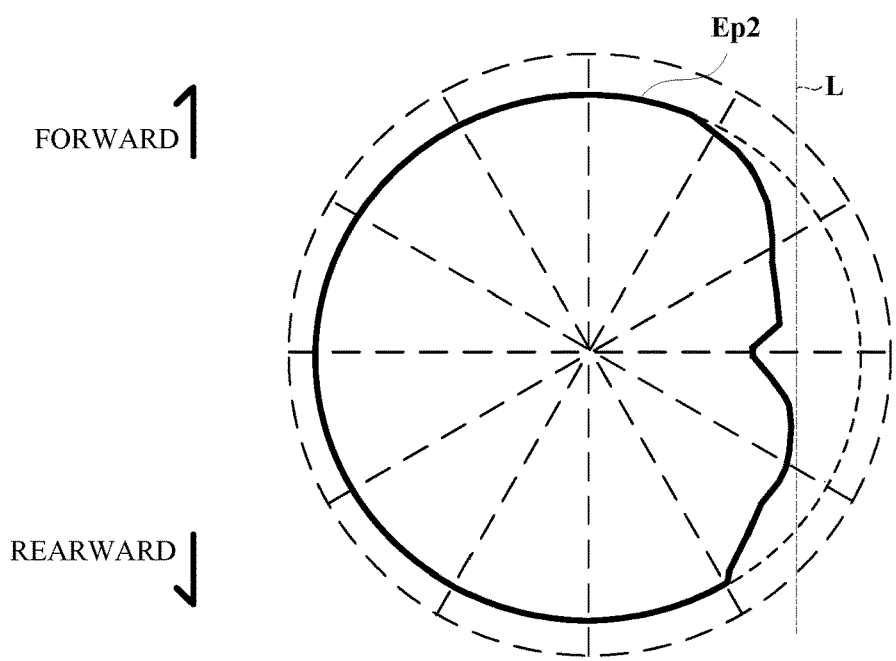
FIG. 7 illustrates an emission condition of electromagnetic waves when the antenna is disposed on the left side of the vehicle.
Figure 16:
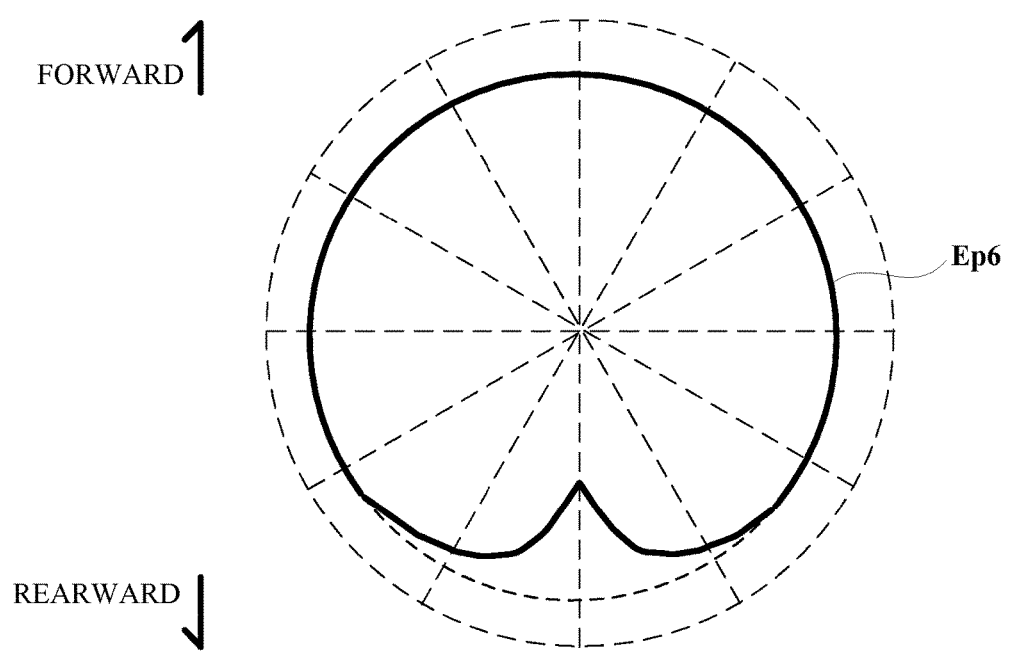
FIG. 16 illustrates an emission condition of electromagnetic waves according to a conventional example of the present invention.

In contrast to this ideal antenna property, FIG. 16 illustrates a property of the non-directional antennas disposed on an anterior part of the vehicle body. As illustrated in FIG. 16, a rearward emission property is degraded due to the influence of absorption or reflection by the rider, leading to a short communication distance to the rearward vehicle. Conversely, when the antenna is disposed on a posterior part of the two-wheeled motor vehicle, a communication distance to the forward vehicle becomes short. Moreover, as illustrated in FIG. 7, when only one antenna is disposed on the left side of the two-wheeled motor vehicle 1, an emission pattern Ep2 is generated that has a shorter communication distance to the other side (the right side in FIG. 7) of the two-wheeled motor vehicle 1 due to absorption or reflection of the two-wheeled motor vehicle 1. That is, a right recess in the radial pattern Ep2 corresponds to the middle line L of the two-wheeled motor vehicle 1. Consequently, the electromagnetic waves rightward from the middle line L have low intensities.

Figure 8:
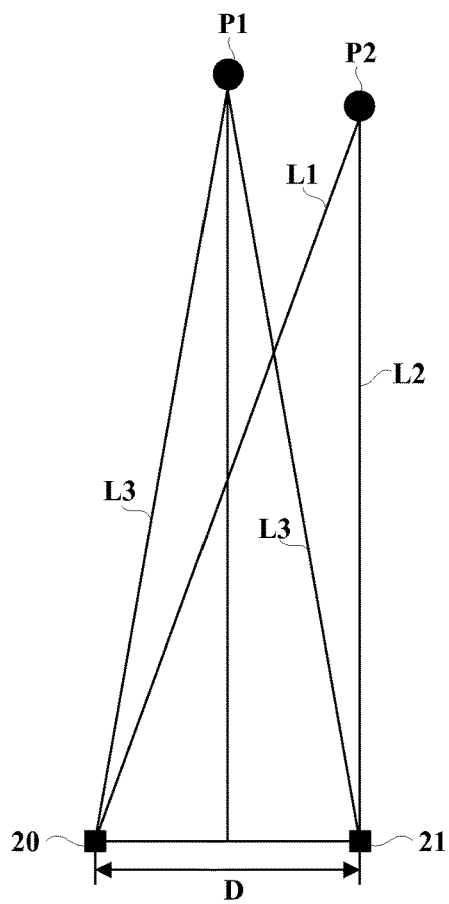
FIG. 8 illustrates an interference condition of electromagnetic waves emitted from two antennas.

In addition, an interference condition of the electromagnetic waves from the two antennas is to be described with reference to FIG. 8. The antennas 20 and 21 are disposed at a distance D. At a receiving point P1, a distance from the antenna 20 is equal to a distance from the antenna 21, and both are denoted by L3. Consequently, the electromagnetic waves at the receiving point 1 from the antenna 20 and the antenna 21 are in the same phase. This causes the electromagnetic waves to be intensified mutually.

At a receiving point P2, a distance L1 from the antenna 20 differs from a distance L2 from the antenna 21 by a difference (L2−L1). When the distance difference (L2−L1) is an even multiple of $\lambda/2$ ($\lambda$: a wavelength of the electromagnetic wave), the electromagnetic waves are in the same phase and are intensified mutually. In this case, the intensity of the electromagnetic wave at the receiving point P1 is equal to that at the receiving point P2. On the other hand, the distance difference (L2−L1) is an odd multiple of $\lambda/2$ ($\lambda$: a wavelength of the electromagnetic wave), the electromagnetic waves are in an antiphase relationship, and are weakened mutually. As a result, the receiving point P2 has degraded reception electric field intensity.

Figure 9:
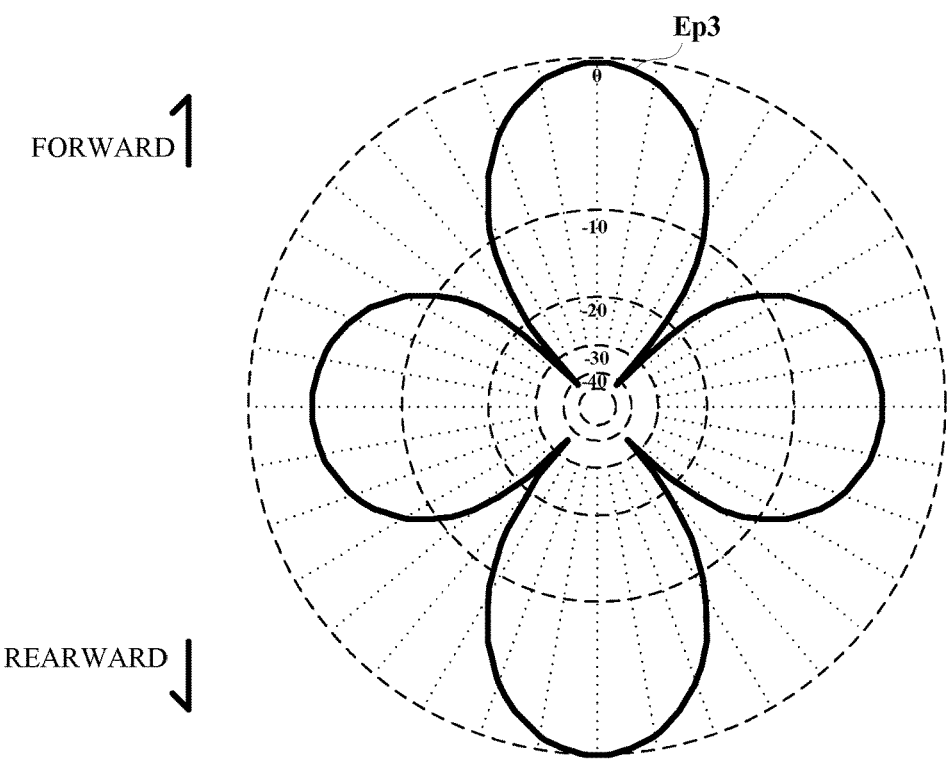
FIG. 9 illustrates an emission condition of the two antennas between which no metal structure is disposed.

FIG. 9 illustrates an emission pattern in which the antennas are disposed on both sides of the two-wheeled motor vehicle 1 and no metal structure is present between the antennas. In FIG. 9, the electromagnetic waves in the same phase are emitted from the two antennas. In such an emission pattern Ep3, at a forward/rearward receiving point at which the distances from the two antennas are substantially equal to each other, the electromagnetic waves from the antennas are combined at the same phase, and thus are highlighted. However, the distances from the two antennas differ largely as the receiving point is shifted obliquely. When the distances from the antennas are each an odd multiple of a ½ wavelength, the electromagnetic waves are combined in the antiphase. This causes degraded electromagnetic waves. As a result, a position may be generated in the oblique direction in which the electromagnetic wave has a low intensity due to the distance and an angle relative to the antennas.

The electromagnetic waves in the traverse direction are combined by the phase difference determined from a distance between the two antennas. In FIG. 9, the two antennas are disposed at a distance D having an interval of 1 wavelength. Accordingly, the electromagnetic waves are combined at the same phase and intensified mutually. On the other hand, in the oblique direction, a point may be generated depending on the position of the receiving point in which a difference in distance from the first antenna and the second antenna is an odd multiple of a ½ wavelength. At this point, the electromagnetic waves are degraded. As noted above, when the two antennas are disposed between which no metal structure is provided, satisfied communications are performable with the forward/rearward vehicles and the side vehicles. On the other hand, unstable communications are performed with the vehicles in the oblique direction.

Figure 10:
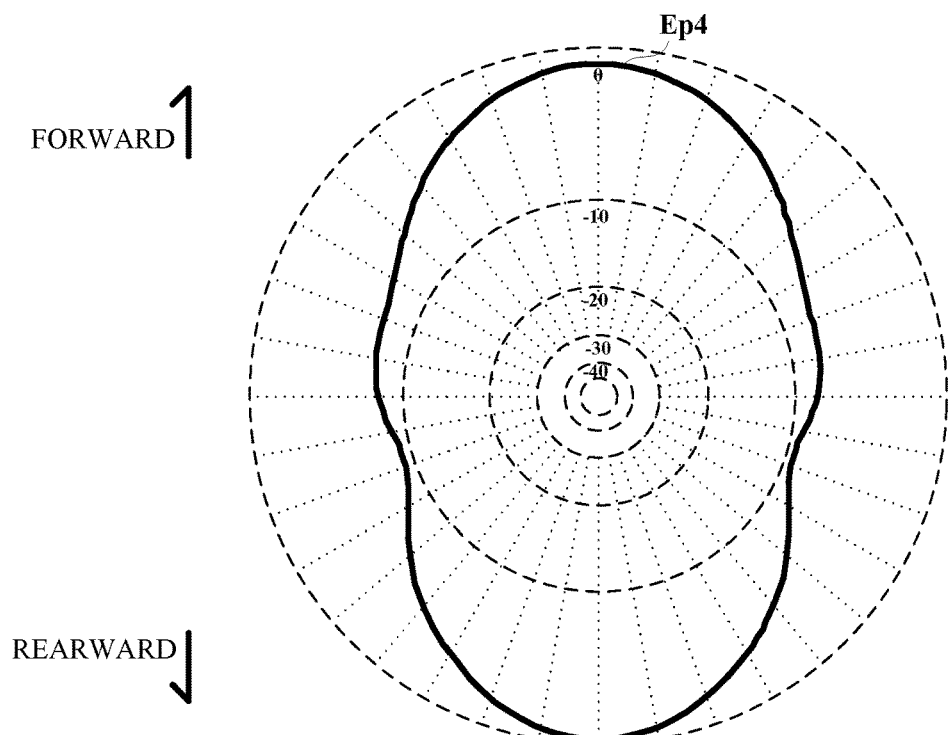
FIG. 10 illustrates an emission condition of the electromagnetic waves from the antenna according to Embodiment 1.

In contrast to this, the arrangement of the antennas in Embodiment 1 achieves the same antenna property, as illustrated in FIG. 10, as the ideal antenna property. In an emission pattern Ep4 according to Embodiment 1, the antennas 20 and 21 outside the main frame 3 allows transmission of the electromagnetic waves intensified mutually in the forward/rearward direction. Moreover, the metal structure allows prevention of interference of the electromagnetic waves in the traverse direction. This allows prevention of degradation in intensity of the electromagnetic waves in the oblique direction, and thus obtains an oval emission pattern having a forward/rearward long axis. As a result, the electromagnetic waves suitable for traveling of the two-wheeled motor vehicle 1 can be transmitted and received.

In addition, the two antennas 20 and 21 are disposed in the same level, leading to a reduced distance difference of the electromagnetic waves in the forward/rearward direction. This achieves satisfied communications.

EMBODIMENT 2

Figure 11:
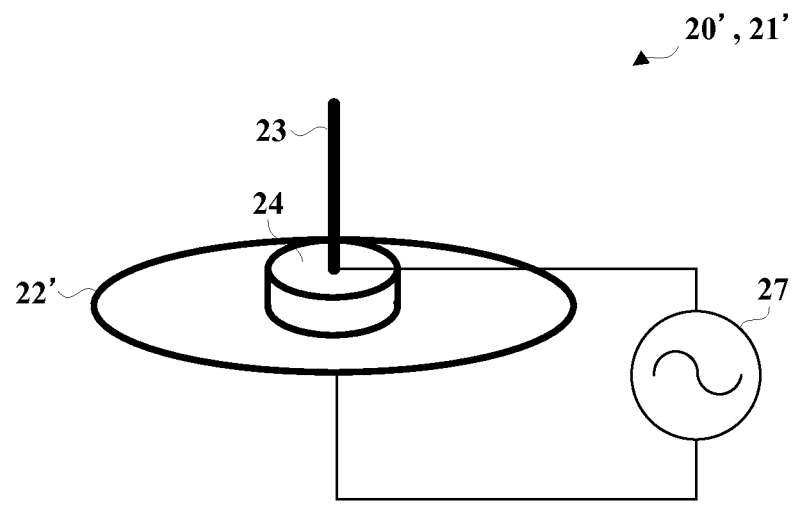
FIGS. 11 and 12 each illustrate an antenna according to Embodiment 2 of the present invention.
Figure 12:
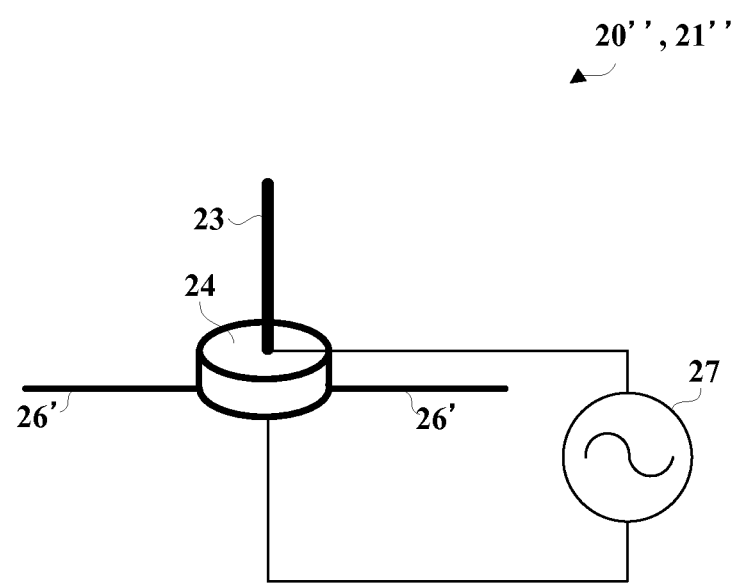

The following describes a two-wheeled motor vehicle of Embodiment 2 with reference to FIGS. 11 and 12. FIGS. 11 and 12 each illustrate a configuration of antennas according to Embodiment 2. In Embodiment 2, the elements denoted by the same numerals as in Embodiment 1 are common to the elements in Embodiment 1, and thus the description thereof is to be omitted. In addition, the configurations of the two-wheeled motor vehicle and the antennas other than the following are common to the configurations in Embodiment 1.

Embodiment 2 has the characteristic in that the antennas disposed in the two-wheeled motor vehicle 1 each have directionality. In Embodiment 1, the non-directional linear antennas are used. In contrast, in Embodiment 2, linear antennas having forward/rearward directionality are used, achieving a longer communication distance in the forward/rearward direction.

Antennas 20' and 21' in Embodiment 2 each include a ground plane 22' extending in the longitudinal direction of the vehicle. See FIG. 11. That is, the ground plane 22' is oval having a long axis in the longitudinal direction of the vehicle. Instead of the oval ground plane 22', two metal wires 26' extending in the longitudinal direction of the vehicle may be used. See FIG. 12.

As noted above, a ground board (ground plane 22', metal wire 26') extending in the longitudinal direction of the vehicle is used, achieving reduction in length of the ground board in the vehicle width direction. Consequently, the antennas are readily disposed in a narrow space between the main frame 3 and the vehicle body cover 14, leading to enhanced arrangement flexibility.

Figure 13:
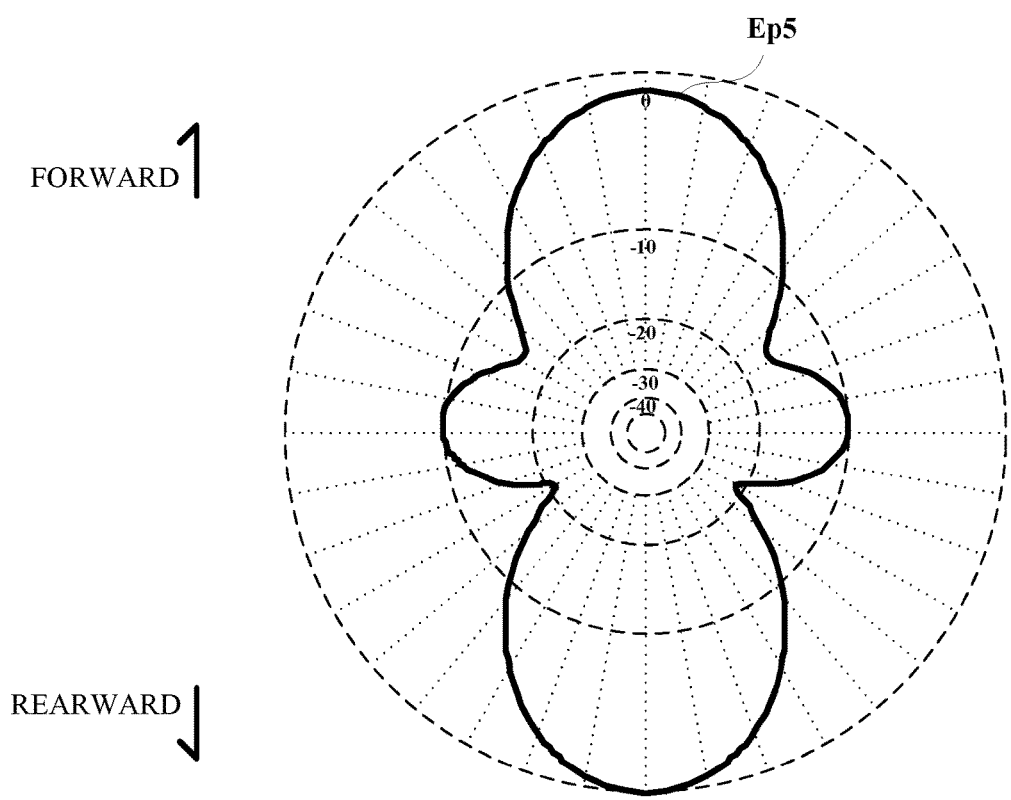
FIG. 13 illustrates an emission condition of electromagnetic waves from the antenna according to Embodiment 2.

The following describes an antenna property in Embodiment 2. FIG. 13 illustrates the antenna property in Embodiment 2. A directionality antenna in Embodiment 2 achieves an antenna property, as illustrated in FIG. 13, similar to the ideal antenna property. An emission pattern Ep5 in Embodiment 2 can obtain an electromagnetic wave property having enhanced forward/rearward directionality although the electromagnetic wave has a lower intensity in the oblique direction than the emission pattern Ep4 in Embodiment 1. Consequently, an oval emission pattern is obtainable having a long axis in the forward/rearward direction. As a result, the electromagnetic waves suitable for traveling of the two-wheeled motor vehicle 1 can be transmitted and received. Also in Embodiment 2, since the two antenna 20' and 21' are disposed in the same level, a distance difference of the electromagnetic waves in the forward/rearward direction can be decreased. This allows sufficient communications.

Modification

The present invention is not limited to the above embodiments, but may be modified as under.

Figure 14:
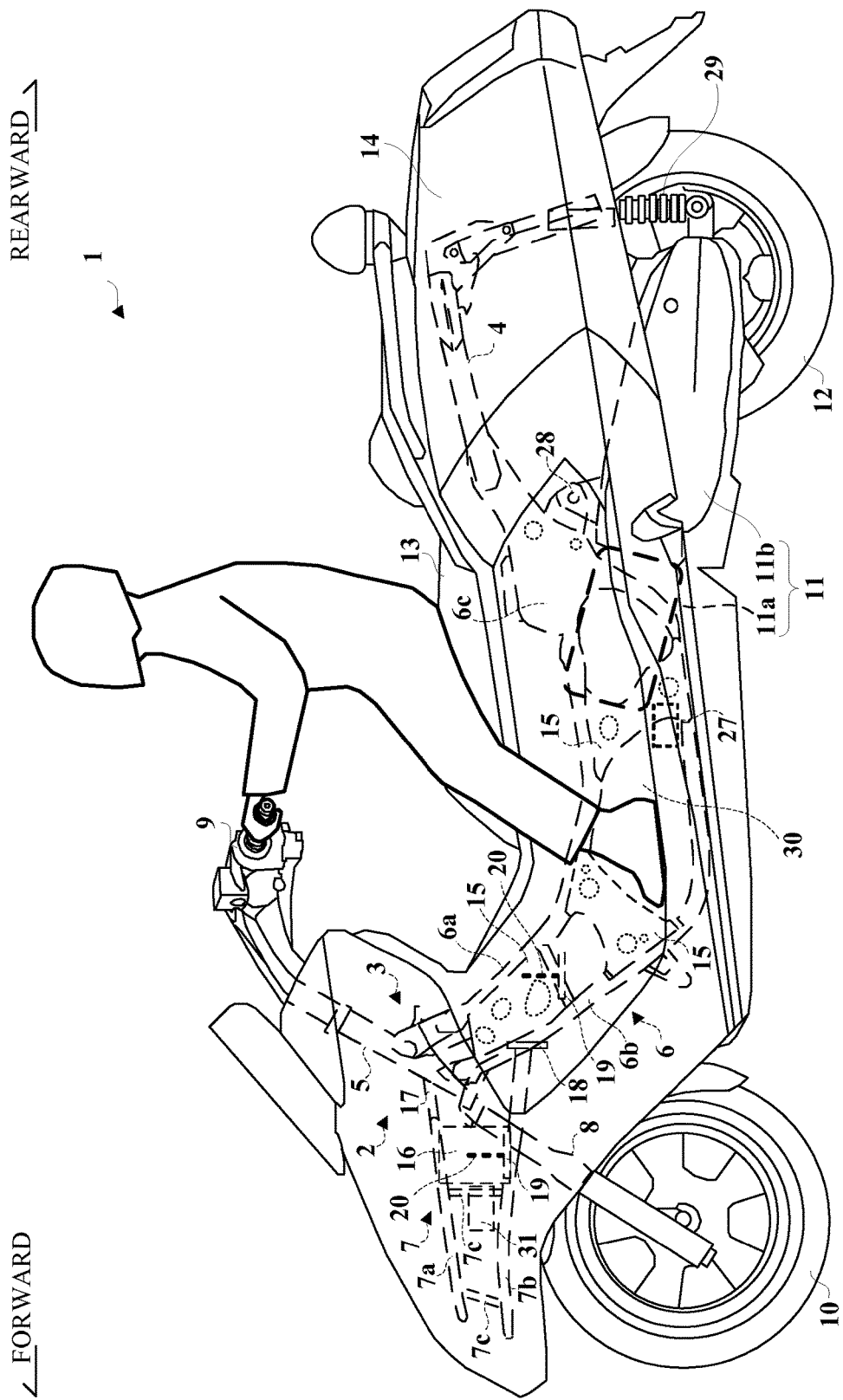
FIG. 14 is a side view of a vehicle according to one modification of the present invention.
Figure 15:
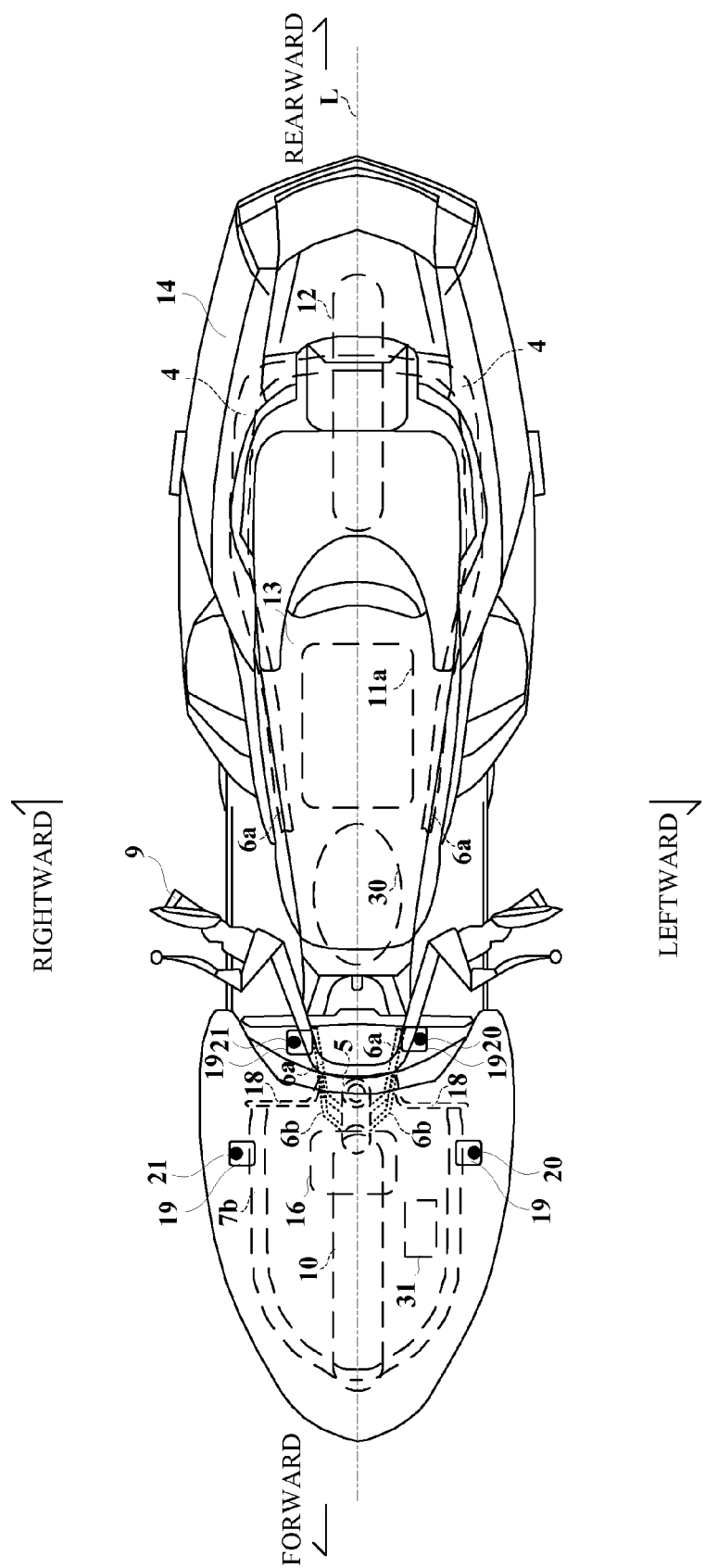
FIG. 15 is a top view of the vehicle according to the modification.

(1) In the Embodiment 1, the two antennas 20 and 21 are disposed across the engine 11*a*. However, this is not limitative. Alternatively, the antennas 20 and 21 may be disposed across the metal structure other than the engine 11*a*. As illustrated in FIGS. 14 and 15, the antennas 20 and 21 may be disposed across the main frame 3 and its reinforcing board 15, or may be disposed across the other metal accessories. Examples of the accessories include a battery 16, a fuel tank 30, an ECU 31, and an ABS (antilock brake system) hydraulic unit (hydraulic pressure unit). That is, the antennas 20 and 21 may be disposed across the battery 16, across the ECU 31, across the ABS hydraulic unit, or across the fuel tank 30.

Embodiment 1 adopts the engine unit 11 of a unit swing type in combination of the engine 11*a* and the transmission case 11*b*. Alternatively, another type engine unit is adoptable. For instance, a rear wheel is suspended by a rear arm, and the engine is itself fixed on the vehicle body. Such an engine unit may be adopted. In this case, a transmission case may be used as the metal structure in addition to a cylinder, a crank case, and an oil pan that form the engine.

In any case, it is preferred that the antennas 20 and 21 are disposed so as not to overlap rider's feet in side view for preventing absorption and reflection by the rider's feet. Moreover, each frame may be adopted as a part of the metal structure. Only the frame insufficiently overlaps the antennas 20 and 21 in side view. However, combination of the frame with the other metal structure may ensure overlap with the antennas 20 and 21 in side view.

(2) In the above embodiments, the antennas having the forward/rearward directionality or the non-directional antennas is adopted. However, this is not limitative. An antenna such as a cardioid antenna having hemispherical directionality may be adopted. In this case, a cardioid recess may be disposed inward the vehicle body.

(3) In the above embodiments, the two-wheeled motor vehicle 1 is a scooter type vehicle provided with an underbone-type frame. However, this is not limitative. For instance, other frames such as a backbone type frame and a diamond type frame may be adopted. In addition, the two-wheeled motor vehicle 1 is not limited to the scooter type. Alternatively, a two-wheeled motor vehicle of other types such as a naked or a touring type may be adopted.

REFERENCE SIGNS LIST

1 . . . two-wheeled motor vehicle
2 . . . vehicle body frame
3 . . . main frame
4 . . . seat frame
5 . . . head tube
7 . . . front frame
11*a* . . . engine
14 . . . vehicle body cover
15 . . . reinforcing board
16 . . . battery
20, 20', 21, 21' . . . antenna
30 . . . fuel tank
31 . . . ECU

The invention claimed is:

1. A two-wheeled motor vehicle, comprising:
a main frame on which a metal structure that reflects electromagnetic waves is mounted, the metal structure including an engine unit; and
first and second antennas, disposed outside the main frame in a width direction of the vehicle, for road-to-vehicle and vehicle-to-vehicle communications, wherein
each of the first and second antennas is a linear antenna, which includes a ground plane and a linear radiation conductor, and
the first and second antennas are placed opposite to each other on two different sides of the metal structure of the main frame, the first and second antennas being so arranged that at least two thirds of the linear radiation conductor of the first antenna and at least two thirds of the linear radiation conductor of the second antenna overlap the engine unit in a side view of the vehicle, so as to form an emission pattern for the first and second antennas that has a larger transmission power in a forward/rearward direction than in the width direction of the vehicle.

2. The two-wheeled motor vehicle according to claim 1, wherein
the first antenna and the second antenna each have forward/rearward directionality.

3. The two-wheeled motor vehicle according to claim 1, wherein the linear antenna is a Brown antenna.

4. The two-wheeled motor vehicle according to claim 1, wherein
the main frame includes a head tube, and a front frame disposed in front of the head tube.

5. The two-wheeled motor vehicle according to claim 1, wherein
the main frame includes a reinforcing board reinforcing rigidity of the main frame.

6. The two-wheeled motor vehicle according to claim 1, wherein
the metal structure further includes a metal accessory.

7. The two-wheeled motor vehicle according to claim 1, wherein
the first antenna and the second antenna are disposed away from a region that overlaps feet of a rider of the vehicle in a travelling attitude in a side view of the vehicle.

8. The two-wheeled motor vehicle according to claim 1, further comprising
a cover covering at least a part of the main frame,
wherein the first antenna and the second antenna are disposed between the cover and the main frame.

9. The two-wheeled motor vehicle according to claim 1, wherein
the first antenna and the second antenna are disposed in a same level in a side view of the vehicle.

10. The two-wheeled motor vehicle according to claim 1, wherein the first antenna and the second antenna fully overlap the main frame or the engine unit in the side view of the vehicle.

11. The two-wheeled motor vehicle according to claim 2, wherein
a first length of the ground plane in a longitudinal direction thereof being larger than a second length of the ground plane in a width direction thereof, and being larger than a length of the linear radiation conductor.

* * * * *